(12) United States Patent
Bravo Orellana et al.

(10) Patent No.: US 11,249,191 B2
(45) Date of Patent: Feb. 15, 2022

(54) METHODS AND SYSTEMS FOR VEHICLE ENVIRONMENT MAP GENERATION AND UPDATING

(71) Applicant: DIBOTICS, Versailles (FR)

(72) Inventors: Raul Bravo Orellana, Paris (FR); Olivier Garcia, Paris (FR)

(73) Assignee: OUTSIGHT, Paris (FR)

( * ) Notice: Subject to any disclaimer, the term of this patent is extended or adjusted under 35 U.S.C. 154(b) by 374 days.

(21) Appl. No.: 16/343,731

(22) PCT Filed: Nov. 17, 2017

(86) PCT No.: PCT/EP2017/079582
§ 371 (c)(1),
(2) Date: Apr. 19, 2019

(87) PCT Pub. No.: WO2018/091651
PCT Pub. Date: May 24, 2018

(65) Prior Publication Data
US 2019/0271780 A1 Sep. 5, 2019

(30) Foreign Application Priority Data

Nov. 18, 2016 (EP) ..................... 16306517

(51) Int. Cl.
*G01S 17/42* (2006.01)
*G01S 7/48* (2006.01)
(Continued)

(52) U.S. Cl.
CPC ............ *G01S 17/42* (2013.01); *G01S 7/4808* (2013.01); *G01S 17/87* (2013.01); *G01S 17/89* (2013.01)

(58) Field of Classification Search
CPC .......... G01S 17/42; G01S 17/87; G01S 17/89; G01S 7/4808
See application file for complete search history.

(56) References Cited

U.S. PATENT DOCUMENTS 7,652,238 B2 1/2010 Haberer et al.
8,989,944 B1 3/2015 Agarwal et al.
(Continued)

OTHER PUBLICATIONS

Besl et al., "A Method for Registration of 3-D Shapes", IEEE Transactions on Pattern Analysis and Machine Intelligence, 1992, vol. 14, No. 2, pp. 239-256.
(Continued)

*Primary Examiner* — Bryan Bui
(74) *Attorney, Agent, or Firm* — Nixon & Vanderhye (57) ABSTRACT

A method and a system for dynamically generating and updating a global tridimensional map of an environment surrounding one or several moving vehicles on which N tridimensional sensors are mounted and communicates with a central processing unit. Each sensor generates a continuous stream of point cloud frames, in parallel and asynchronously with the other sensors, the point cloud frames are representative of object surfaces located in a local volume of the environment surrounding each sensor. The central processing unit continuously receives the continuous streams from the sensors, store them in a memory and, for each newly received point cloud frame of each stream, generates or updates a global cumulated tridimensional map of the environment of the at least one vehicle by determining an aligned point cloud frame in a global coordinate system of the environment, and updating the global cumulated tridimensional map by merging the aligned point cloud frame.

20 Claims, 4 Drawing Sheets

(51) Int. Cl.
*G01S 17/87* (2020.01)
*G01S 17/89* (2020.01)

(56) References Cited

U.S. PATENT DOCUMENTS

| | | |
|---|---|---|
| 9,151,446 B2 | 10/2015 | Doettling et al. |
| 2012/0143808 A1* | 6/2012 | Karins ................... G06N 7/005 |
| | | 706/46 |
| 2013/0242285 A1 | 9/2013 | Zeng |
| 2014/0005933 A1 | 1/2014 | Fong et al. |
| 2017/0124781 A1* | 5/2017 | Douillard ......... G08G 1/096816 |

OTHER PUBLICATIONS

International Search Report and Written Opinion, dated Feb. 27, 2018, from corresponding PCT application No. PCT/EP2017/079582.

Chen et al., "Object Modeling by Registration of Multiple Range Images," Proceedings of the 1991 IEEE International Conference on Robotics and Automations, Sacramento, California, Apr. 1991, pp. 2724-2729.

* cited by examiner

METHODS AND SYSTEMS FOR VEHICLE ENVIRONMENT MAP GENERATION AND UPDATING

FIELD OF THE INVENTION

The instant invention relates to methods for dynamically generating and updating a global tridimensional map of an environment surrounding at least one moving vehicle. The invention also relates to global tridimensional map generating and updating systems for convoys of vehicles and to convoys of autonomous or semi-autonomous vehicles comprising such systems.

BACKGROUND OF THE INVENTION

The present application belong the field of the generation of tridimensional environment maps that are representative of the surroundings of one or several moving vehicles. These maps are dynamically generated and updated using tridimensional sensors mounted on said vehicles.

A tridimensional sensor acquires sets of data points, called point clouds, that are representatives of the objects located in a local volume of the environment surrounding said sensor. One example of a commonly used tridimensional sensor is a laser rangefinder such as a light detection and ranging (LIDAR) module which periodically scans its environment using a rotating laser beam.

Providing a single vehicle or a convoy of vehicle with tridimensional sensors has many interesting applications.

The acquired point clouds can be used to generate 3D maps of the environment seen by the vehicles during a travel for mapping purposes. The 3D maps may also be used to assist or to automate the driving of the vehicles, in particular to automate the driving of a single or a convoy of autonomous vehicles.

Using a plurality of tridimensional sensor greatly improves the coverage and accuracy of the map that can be generated from said point clouds by increasing the scope and the resolution of the maps and avoiding shadowing effect. The sensors may be mounted at various locations on the body of a vehicle and/or on each vehicle of a convoy of vehicles.

However, combining point clouds generated by separated tridimensional sensors is a non-trivial procedure as the raw data generated by each tridimensional sensor is sparse, noisy and discretized.

U.S. Pat. Nos. 7,652,238 and 9,151,446 describe systems and apparatus designed to combine the information coming from several 3D sensors. In these apparatuses, a uniform coordinate system is defined for all 3D sensors of the system and the location and orientation of the sensors are calibrated in this common coordinates system.

In such systems, the respective position of each sensor has to be fixed and stable over time to be able to merge the measurements in a reliable manner. This restrict the usability of such multiple sensor systems to sensor mounted on a single rigid structure and precludes their use in the case of a convoy of independently moving vehicles. Moreover the accurate determination of the sensor's relative positions and orientations requires 3D measurement tools and 3D input interfaces that are difficult to manage for a layman operator. As a consequence, if a sensor becomes misaligned, e.g. due to shocks, aging or weather-related conditions, there are usually no easy way to correct the misalignment other than to replace the mounting stage with the sensor or to bring back the vehicle to a factory for recalibration.

US App. 2013/0242285A describes a method to automatically adjust the relative calibration of two tridimensional sensors, in particular when the location or orientation of one sensor become modified and the sensor becomes misaligned as mentioned above. According to this method, two point clouds simultaneously acquired by the two tridimensional sensors are compared together in order to update a transformation function between the local coordinate systems of these two sensors and to determine a potential displacement of one of said sensor with regard to the other sensor.

However, to be able to use such a method, the sensors must be carefully synchronized so that the point cloud frames that are compared are acquired simultaneously. Otherwise, as soon as the vehicle on with the sensors are mounted starts moving, different acquisition time for each sensors will lead to the computation of an erroneous displacement between the sensors. Moreover, the fields of view of the two sensors must overlap in order to be able to compare the acquired point clouds. These two conditions are difficult to meet in practice, in particular when the sensors that are mounted on distant vehicles in a convoy of vehicles.

In particular, distant vehicles in a convoy of vehicles usually experiment significant relative motion during a travel and the field of view of sensors mounted on different vehicle are often non-overlapping. One common non-overlapping situation arises when a first vehicle has negotiated a corner but a following second vehicle has not. The field of view of the sensors mounted the first and the second vehicle are then usually non-overlapping and no combination of the acquired point cloud can be made, even if the sensors are carefully synchronized.

One solution can then be to use other localisation devices to combine the point cloud acquired by separate sensors. An example of additional localization device is a Global Positioning System (GPS). These fall-back solutions are not satisfactory since they bring additional complexity to the system as well as additional sources of errors and corner cases (GPS don't work in tunnels and underground for instance and their accuracy is limited).

The present invention aims at improving this situation.

To this aim, a first object of the invention is a method for dynamically generating and updating a global tridimensional map of an environment surrounding at least one moving vehicle, in which a plurality of N tridimensional sensors is mounted on said at least one moving vehicle and communicates with at least one central processing unit, wherein:

a) each sensor of the plurality of N tridimensional sensors generates a continuous stream of point cloud frames, in parallel and asynchronously with the other sensors of the plurality of tridimensional sensors, each point cloud frame of said stream comprises a set of tridimensional data points acquired by said sensor at a time, in a local coordinate system of said sensor, said tridimensional data points being representative of object surfaces located in a local volume of the environment surrounding said sensor at said time, b) said central processing unit continuously receives the plurality of N continuous streams from the N tridimensional sensors, stores said plurality of streams in a memory and, for each newly received point cloud frame of each stream of said plurality of streams, generates or updates a global cumulated tridimensional map of the environment of said at least one vehicle by b1) determining an aligned point cloud frame in a global coordinate system of the environment of said at least one vehicle by comparing said point cloud frame with the global cumulated tridimensional map of the environment, and b2) updating said global cumulated tridimensional map by merging said aligned point cloud frame with said global cumulated tridimensional map.

In some embodiments, one might also use one or more of the following features:

the global cumulated tridimensional map comprises at least one global coordinate system and at least one associated sub-area comprising a plurality of data points in said global coordinate system, said step b1) of determining an aligned point cloud frame comprises:

b11) trying to align said point cloud frame so that at least a portion of the aligned point cloud frame matches at least a portion of said at least one sub-area of the global cumulated tridimensional map, by comparing said point cloud frame with each sub-area of the global cumulated tridimensional map of the environment, and said step b2) of updating said global cumulated tridimensional map of environment comprises:

b21) if said point cloud frame can be aligned with at least one sub-area of the global cumulated tridimensional map of the environment, merging the aligned point cloud frame with said at least one sub-area of the global cumulated tridimensional map, b22) if said point cloud frame cannot be aligned with at least one sub-area of the global cumulated tridimensional map of the environment, generating an additional global coordinate system and an associated additional sub-area of the global cumulated tridimensional map, said additional sub-area of the global cumulated tridimensional map being separated from the sub-areas previously contained in the global cumulated tridimensional map and comprising said point cloud frame;

if the global cumulated tridimensional map comprises several sub-areas, step b11) of trying to align a point cloud frame further comprises trying to align together, in a multi-scan alignment step, said sub-areas and said point cloud frame, so that at least a portion of an aligned point cloud frame matches with at least one sub-area of the global cumulated tridimensional map, and if the point cloud frame can be aligned with a plurality of sub-areas of the global cumulated tridimensional map, said plurality of sub-areas and said point cloud frame are aligned and merged in a single sub-area of the global cumulated tridimensional map associated to a single global coordinate system;

the N tridimensional sensors comprises at least one first tridimensional sensor mounted on a first moving vehicle and at least one second tridimensional sensor mounted on a second moving vehicle, and said at least one first tridimensional sensor and said at least one second tridimensional sensor communicates wirelessly with a common central processing unit and the global cumulated tridimensional map comprises a common sub-area representing the environment surrounding the first moving vehicle and the environment surrounding the second moving vehicle;

the global cumulated tridimensional map comprises a common global coordinate system associated to said common sub-area representing the environment surrounding the first moving vehicles and the environment surrounding the second moving vehicle, in which point cloud frames generated by the at least one first tridimensional sensor and point cloud frames generated by the at least one second tridimensional sensor are converted;

said step b1) of determining an aligned point cloud frame for a newly received point cloud frame of a stream of the plurality of N continuous streams comprises determining a tridimensional position and orientation, at at least one time, of a sensor generating said stream, in the global coordinate system of the environment;

the determination of the tridimensional position and orientation, at at least one time, of said sensor is computed only from the newly received point cloud frame of the stream and the global cumulated tridimensional map, and without additional positioning information of the at least one vehicle or of the plurality of tridimensional sensors;

a first sensor and a second sensor of the plurality of N tridimensional sensors are unsynchronized at least during a period of time T, in particular, point cloud frames of the respective streams of the first sensor and the second sensor acquired during said period of time T are acquired at differing times $t_j^i \neq t_{j'}^{i'}$, $\forall j,j'$ such as $t_j^i, t_{j'}^{i'} \in T$;

a first sensor and a second sensor of the N tridimensional sensors have non-overlapping respective fields of view at least during a period of time T, in particular, point cloud frames of the respective streams of the first sensor and the second sensor acquired during said period of time T cover non-overlapping respective local volumes $L_j^i \cap L_{j'}^{i'} = \emptyset, \forall j,j'$ such as $t_j^i, t_{j'}^{i'} \in T$;

the step of determining an aligned point cloud frame in a global coordinate system of the environment comprise a step of segmenting data points of the point cloud frame to identify and flag data points representative of the environment and data points representative of the vehicle on which the sensor that acquired said point cloud frame is mounted, in particular the aligned point cloud frame is restricted to data points representative of the environment.

Another object of the invention is a global tridimensional map generating and updating system for at least one vehicle, the system comprising a plurality of N tridimensional sensors adapted to be mounted on said at least one vehicle, each sensor of the plurality of N tridimensional sensors being adapted to generate a continuous stream of point cloud frames, in parallel and asynchronously with the other sensors of the plurality of tridimensional sensors, each point cloud frame of said stream comprises a set of tridimensional data points acquired by said sensor at a time, in a local coordinate system of said sensor, said tridimensional data points being representative of object surfaces located in a local volume of the environment surrounding said sensor at said time, a central processing unit adapted to communicate with each tridimensional sensor of said plurality of sensors to continuously receive the plurality of N continuous streams from the N tridimensional sensors, store said plurality of streams in a memory and update a global cumulated tridimensional map of the environment surrounding said at least one vehicle by determining, for each newly received point cloud frame of each stream of said plurality of streams, an aligned point cloud frame in a global coordinate system of the environment of said at least one vehicle by comparing said point cloud frame with the global cumulated tridimensional map of the environment and updating said global cumulated tridimensional map by merging said aligned point cloud frame with said global cumulated tridimensional map.

Another object of the invention is an autonomous or semiautonomous vehicle comprising a global tridimensional map generating and updating system as detailed above, wherein the plurality of N tridimensional sensors of said system is mounted on said vehicle, and the vehicle comprises a vehicle processing unit adapted to receive and store the global cumulated tridimensional map generated and updated by said system and to assist or control a driving of the vehicle based at least on said global cumulated tridimensional map.

Yet another object of the invention is a convoy of autonomous or semiautonomous vehicles comprising a plurality of autonomous or semiautonomous vehicles and a global tridimensional map generating and updating system as detailed above, wherein at least one tridimensional sensor of the plurality of N tridimensional sensors is mounted on each vehicle of the convoy, each vehicle of the convoy comprises a vehicle processing unit adapted to receive and store the global cumulated tridimensional map generated and updated by said system and to assist or control a driving of the vehicle based at least on said global cumulated tridimensional map.

In one embodiment, the vehicle processing unit of each vehicle of the convoy is a central processing unit of the system and is adapted to communicate with each tridimensional sensor of said plurality of sensors to continuously receive the plurality of N continuous streams from the N tridimensional sensors, store said plurality of streams in a memory and update a global cumulated tridimensional map of the environment surrounding the convoy of vehicles.

Yet another object of the invention is a non-transitory computer readable storage medium, having stored there on a computer program comprising program instructions, the computer program being loadable into a central processing unit of a global tridimensional map generating and updating system as detailed above and adapted to cause the central processing unit to carry out the steps of a method as detailed above, when the computer program is run by the central processing unit.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different figures, the same reference signs designate like or similar elements.

DETAILED DESCRIPTION

Figure 1:
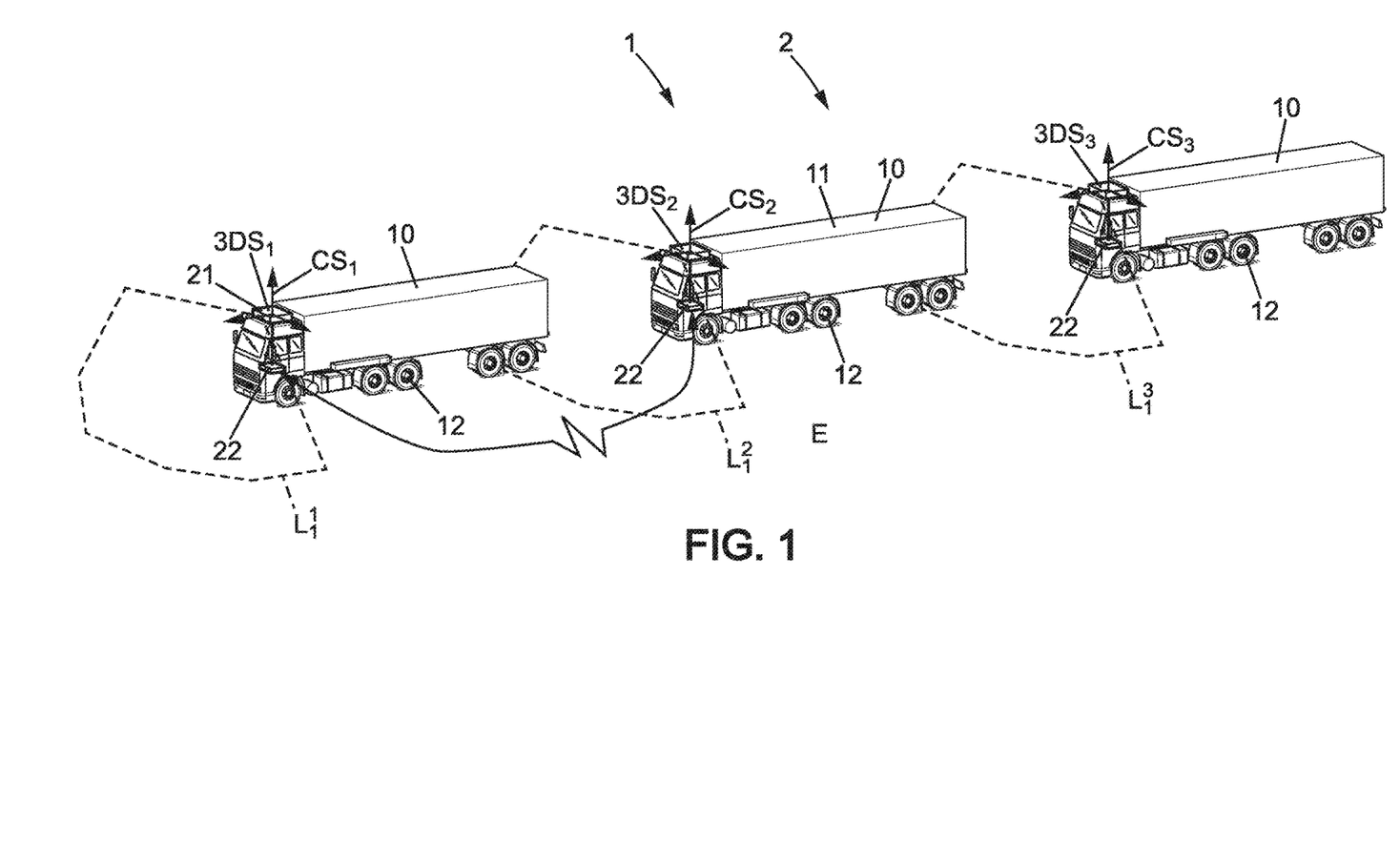
FIG. 1 is a schematic perspective view of a convoy of vehicle comprising a global tridimensional map generating and updating system according to an embodiment of the invention.

FIG. 1 illustrates a convoy 1 of vehicles 10 according to one embodiment of the invention.

Figure 2:
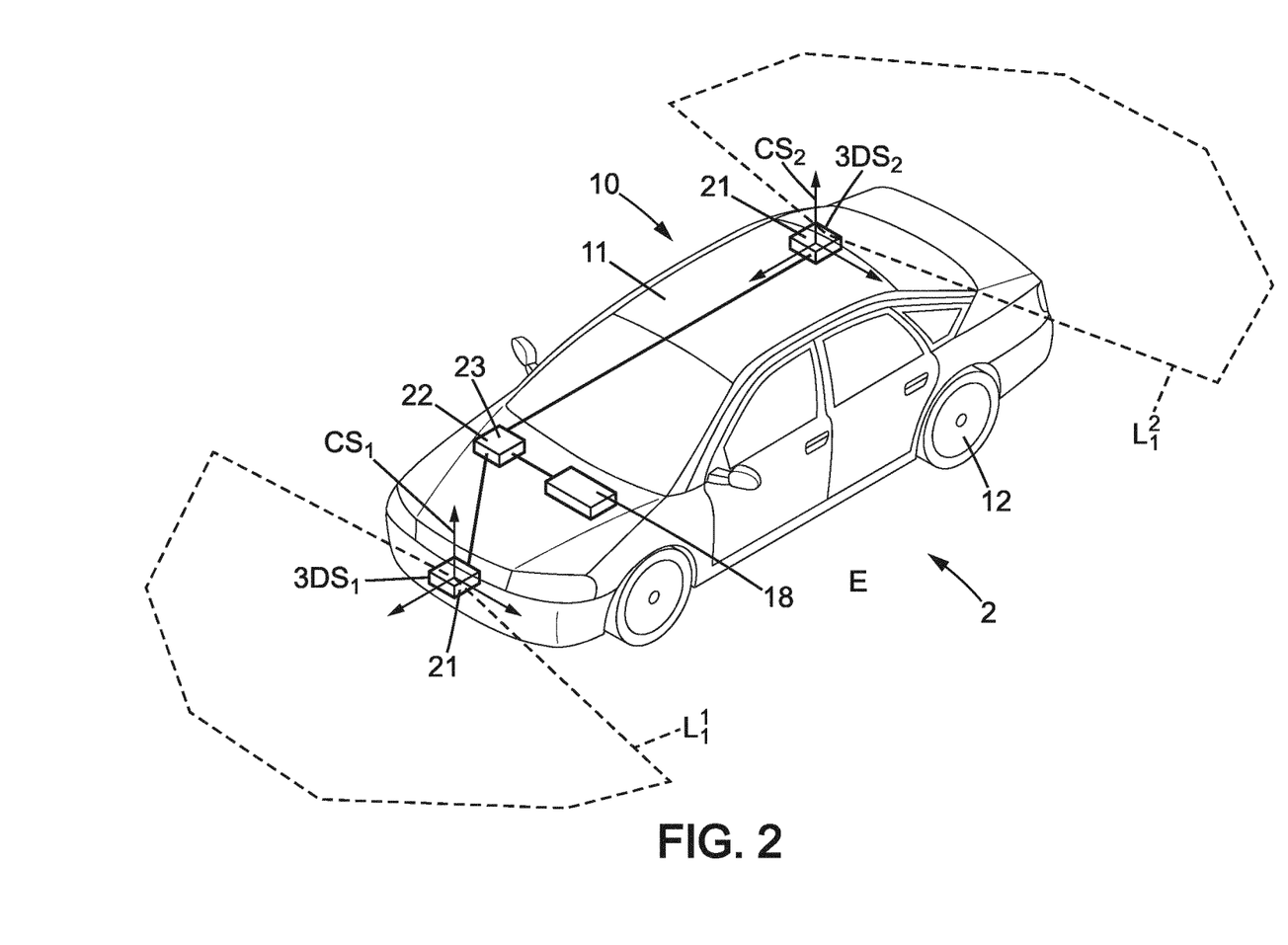
FIG. 2 is a schematic perspective view of a single vehicle comprising a global tridimensional map generating and updating system according to an embodiment of the invention.

A vehicle 10, which can be part of a convoy 1 of vehicle, is illustrated in greater details on FIG. 2. Such a vehicle 10 is also an object of the invention itself as detailed further below.

The invention can be applied to a wide range of vehicles comprising wheeled vehicles but also flying, sailing, diving or space vehicles. Specific examples of vehicles according to the invention comprise cars, robots, drones, and the like.

One class of vehicle of specific interest to the invention is the class of self-propelled steerable vehicles and in particular autonomous or semi-autonomous vehicles like self-driving cars or self-driving trucks for instance.

As illustrated on FIG. 2, the vehicle 10 is provided with a body 11 which delimits an inside of the vehicle from an environment E of the vehicle 10.

On the example of FIG. 1, the vehicles 10 are trucks provided with a chassis and several wheels 12 whose direction can be controlled to follow a specific path and can for instance drive in a line along a road.

A single vehicle 10 and/or a convoy 1 of vehicles 10 is provided with a global tridimensional map generating and updating system 20 illustrated on FIGS. 1 and 2.

The global tridimensional map generating and updating system 20 comprises a plurality of N tridimensional sensors 21 that are mounted on or inside the body 11 of the vehicle 10, if there is only one vehicle considered, or mounted on or inside the body 11 of each vehicle 10 of the convoy 1, if the invention is applied to a convoy of vehicles 1.

For instance, a single vehicle 10 may be provided with two tridimensional sensors respectively mounted on the front and the back of the vehicle 10 as illustrated on FIG. 2.

In another embodiment of the invention, each vehicle 10 of a convoy 1 of vehicle may be provided with a tridimensional sensor as illustrated on FIG. 1.

In the present specification, the tridimensional sensors are referred to, in a general way, by the reference number 21, and in a specific way, by the reference $3DS_i$ where i is an index ranging from 1 to the number N of tridimensional sensors 21 in the system 20.

Each tridimensional sensor $3DS_i$ of the plurality of N tridimensional sensors generates a continuous stream $ST_i$ of data.

The data are preferably analog data. This allows a good accuracy and a good resolution of the global tridimensional map according to the invention.

Each tridimensional sensor $3DS_i$ of the plurality of N tridimensional sensors generates a continuous stream $ST_i$ of point cloud frames ($PCF_0^i$, $PCF_1^i$, . . . ). The point cloud frames ($PCF_0^i$, $PCF_1^i$, . . . ) are preferably not sampled to comply with a sampling grid for instance, which would lower the resolution of the global tridimensional map.

The continuous stream $ST_1$, . . . , $ST_N$ respectively acquired by the sensors $3DS_1$, . . . , $3DS_N$, are generated in parallel and asynchronously.

By "in parallel and asynchronously", it is meant that the sensors are in general unaware of each other and the acquisitions of the sensors are not specifically synchronized together.

Besides, by "in parallel and asynchronously", it can also be meant that the position of the sensors and/or the acquisition time of the sensors can be unspecified or unknown according to the method of the invention.

More precisely, the respective positions of the sensors are not needed. These respective positions of the sensors can even vary over time according to the method of the invention without affecting the accuracy and/or resolution of the global tridimensional map.

This can be also stated as follows. The plurality of N tridimensional sensors $3DS_1, \ldots, 3DS_N$ comprises at least a first sensor $3DS_k$ and a second sensor $3DS_l$ that are unsynchronized at least during a period of time T. Thus, two point cloud frames $PCF_j^k$, $PCF_{j'}^l$, of the respective streams $ST_k$, $ST_l$ of the first sensor $3DS_k$ and the second sensor $3DS_l$ that are acquired during said period of time T are acquired at differing respective times $t_j^k$, $t_{j'}^l$. The timing of acquisition of the point cloud frames $PCF_j^k$, $PCF_{j'}^k$, of the two sensors $3DS_k$, $3DS_l$ are thus such that $t_j^k \neq t_{j'}^l$, $\forall j, j'$ such as $t_j^k, t_{j'}^l \in T$.

Each point cloud frame $PCF_j^i$ of a stream $ST_i$ comprises a set of tridimensional data points acquired by said sensor $3DS_i$ at a time $t_j^i$, in a local coordinate system $CS_i$ of said sensor.

The tridimensional data points are representative of object surfaces located in a local volume $L_j^i$ of the environment surrounding the sensor $3DS_i$ at said time $t_j^i$.

The N tridimensional sensors doesn't need to have overlapping fields of views.

By "the tridimensional sensors doesn't need to have overlapping fields of views", we mean that the sensors may be moving independently from one another and thus have overlapping field at a certain time t and then (or before) non-overlapping field of view during an extended period of time T.

In particular, here again, a first sensor $3DS_k$ and a second sensor $3DS_l$ of the N tridimensional sensors $3DS_1, \ldots, 3DS_N$ may have non-overlapping field of view at least during a period of time T. Thus, two point cloud frames $PCF_j^k$, $PCF_{j'}^l$ of the respective streams $ST_k$, $ST_l$ of the first sensor $3DS_k$ and the second sensor $3DS_l$ that are acquired during said period of time T cover non-overlapping respective local volumes $L_j^k$ and $L_{j'}^l$. This can also be expressed by stating that $L_j^k \cap L_{j'}^l = \emptyset, \forall j,j'$ such as $t_j^k, t_{j'}^l \in T$.

In the present specification, a point cloud frame acquired by a specific sensor $3DS_i$ is referred to as $PCF_j^i$, the time of acquisition of this point cloud frame $PCF_j^i$ is referred as $t_j^i$ and the local volume of the environment surrounding the sensor $3DS_i$ at said time $t_j^i$ is referred as $L_j^i$. In these references, the superscript i is the index of the associated sensor $3DS_i$ ranging from 1 to the number N of tridimensional sensors, and the subscript j is the index of the frame in the continuous stream $ST_i$, j increasing over time with each newly acquired frame.

By a "tridimensional data point", it is understood at least the three-dimensional coordinates of a point of the environment of the sensor in a coordinate system, for instance a local coordinate system $CS_i$ of said sensor as detailed below. A tridimensional data point may comprise additional characteristics, for instance the intensity of the signal detected by the sensor at said point.

By "point cloud frame", it is meant a point cloud acquired at a specific time, or during a short interval of acquisition, for instance the time need for a complete scan of the environment by the laser beam of a LIDAR.

By "continuous stream of point cloud frames", it is meant a succession of point cloud frames organized in a stream of data.

The point clouds may in particular be acquired in a local coordinate system $CS_i$ associated to each sensor $ST_i$.

The local coordinate system $CS_i$ is a coordinate system related to a sensor $ST_i$, for instance with an origin point located at the sensor location. The local coordinate system $CS_i$ may be a cartesian, cylindrical or polar coordinate system.

A tridimensional sensor 21 may for instance comprise a laser rangefinder such as a light detection and ranging (LIDAR) module, a radar module, an ultrasonic ranging module, a sonar module, a ranging module using triangulation or any other device able to acquire the position of a single or a plurality of points P of the environment in a local coordinate system $CS_i$ of the sensor $ST_i$.

In a preferred embodiment, a tridimensional sensor 21 emits an initial physical signal and receives a reflected physical signal along controlled direction of the local coordinate system. The emitted and reflected physical signals can be for instance light beams, electromagnetic waves or acoustic waves.

The sensor 21 then computes a range, corresponding to a distance from the sensor 21 to a point P of reflection of the initial signal on a surface of an object located in a volume surrounding the sensor 21. Said range may be computed by comparing the initial signal and the reflected signal, for instance by comparing the time or the phases of emission and reception.

The coordinates of a tridimensional data point in the local coordinate system of the sensor 21 can then be computed from said range and said controlled direction.

In one example, the sensor 21 comprises a laser emitting light pulses with a constant time rate, said light pulses being deflected by a moving mirror rotating along two directions. Reflected light pulses are collected by the sensor and the time difference between the emitted and the received pulses give the distance of reflecting surfaces of objects in the environment of the sensor 21. A processor of the sensor 21, or a separate processing unit, then transform, using simple trigonometric formulas, each observation acquired by the sensor into a three-dimensional data point D.

A point cloud comprising a full scan of the local environment of sensor 21 is periodically acquired and comprises a set of tridimensional data points D representative of the objects in the volume surrounding the sensor 21.

By "full scan of the local environment", it is meant that the sensor 21 has covered its complete field of view. For instance, after a full scan of the local environment, the moving mirror of a laser-based sensor is back to an original position and ready to start a new period of rotational movement. A full scan of the local environment by the sensor is thus the three-dimensional equivalent of an image acquired by a bi-dimensional camera.

A set of tridimensional data points D acquired in a full scan of the local environment of sensor 21 is a point cloud. The sensor 21 is able to periodically acquire point clouds frames with a given framerate.

Since the sensor is mounted on a moving vehicle the environment surrounding the vehicle changes over time. A point cloud $PCF_j^i$ acquired by a sensor $3DS_i$ at said time $t_j^i$ thus comprises a full scan of a local volume $L_j^i$, of the environment surrounding the sensor $3DS_i$ at said time $t_j^i$.

The global tridimensional map generating and updating system 2 further comprises a central processing unit 22 connected to each tridimensional sensor 21 of the plurality of sensors and able to communicate with each tridimensional sensor of the plurality of sensors.

The central processing unit 22 may communicate with the tridimensional sensors 21 by wireless communication, such as radio or optic communications, or by wired communications, for instance is the central processing unit 22 and the tridimensional sensor 21 are mounted on the same vehicle 10. The central processing unit 22 may communicate with the tridimensional sensors 21 by using some intermediary device, in particular for long range communication.

The central processing unit 22 is adapted to continuously receive the plurality of N continuous streams $ST_1, \ldots, ST_N$ from the N tridimensional sensors $3DS_1, \ldots, 3DS_N$.

By "continuously receive", it is meant that every time a sensor has acquired a new point cloud frame, or a short sequence of point cloud frames, said point cloud frame or short sequence is send to the central processing unit 22 without having to wait the end of a vehicle trip for instance.

The central processing unit 22 can be integrated inside a specific sensor among the plurality of sensors 21 in a single unit or alternatively, can be a distinct unit secured inside a vehicle 1. In some embodiments, the central processing unit 22 may be a part of the vehicle processing unit 18 of a vehicle 10.

The vehicle processing unit 18 may be able to operate a self-driving or a driving assistance algorithm to drive or assist the driving of the vehicle 10, in particular by using the map provided by the system and method according to the invention.

In one embodiment of the invention, the vehicle processing unit 18 of a vehicle 10 in a convoy 1 is thus able to autonomously follow the path of a preceding vehicle of the convoy 1 by using the global cumulated tridimensional map generated and updated by the system and the method of the invention.

In some embodiment, a global tridimensional map generating and updating system 2 according to the invention can comprise a plurality of central processing units 22, in particular, each vehicle 10 or each sensor 21 may be provided with an associated central processing unit 22. In this case, each central processing unit 22 is able to communicate with each tridimensional sensor of the plurality of sensors 21, directly or by some intermediary.

The processing unit 22 is able to process the point clouds and point cloud frames received from said sensor 21 to dynamically generates and updates a global cumulated tridimensional map CM of the environment E surrounding the moving vehicle(s) 10.

The global cumulated tridimensional map is also sometimes referred as a global tridimensional map, a global 3D map or a 3D map in the following for the purpose of brevity. These expressions cover the same concept and the same feature of the invention.

By "dynamically generating and updating a global tridimensional map of the environment surrounding the moving vehicle(s)", it is meant that the generation and the update of the global tridimensional map are performed while the vehicle(s) are moving.

A method for dynamically generating and updating a global tridimensional map CM of an environment E surrounding at least one moving vehicle 10 according to an embodiment of the invention is illustrated on FIGS. 3 and 4 and will now be described in further details.

The method is implemented using a plurality of N tridimensional sensors 21 mounted on said at least one moving vehicle and a communicating with at least one central processing unit.

On the example of FIG. 1, the N tridimensional sensors 21 are respectively mounted on each respective vehicle 10 of a convoy 1 of N vehicles.

Moreover, each vehicle 10 of the convoy 1 of N vehicles carries a central processing unit 22 that is able to communicate with each sensor 21 of the plurality of N tridimensional sensors to receive the continuous stream of point cloud frame generated by said sensor.

In particular, a central processing unit 22 mounted on vehicle i of the convoy may receive the continuous stream $ST_j$ of point cloud frames generated by a sensor j (j≠i) by the intermediation of the central processing unit 22 mounted on said vehicle j. Thus, the central processing unit 22 mounted on each vehicle j of the convoy may take care of receiving the continuous stream of point cloud frames from sensor $3DS_j$ and transmit said continuous stream to each central processing unit 22 of each vehicle of the convoy 1. To this aim, the central processing units 22 of the vehicles of the convoy 1 may be able to communicate together, for instance by wireless communication.

As mentioned above, during the operation of the method, each sensor $3DS_i$ of the plurality of N tridimensional sensors $3DS_1, \ldots, 3DS_N$ generates a continuous stream $ST_i$ of point cloud frames $PCF_0^i, PCF_1^i, \ldots$, in parallel and asynchronously with the other sensors of the plurality of tridimensional sensors.

Each point cloud frame $PCF_j^i$ of said stream $ST_i$ comprises a set of tridimensional data points acquired by said sensor $3DS_i$ at a time $t_j^i$, in a local coordinate system $CS_i$ of said sensor, said tridimensional data points being representative of object surfaces located in a local volume $L_j^i$ of the environment surrounding said sensor $3DS_i$ at said time $t_j^i$.

The central processing unit 22 continuously receives the plurality of N continuous streams $ST_1, \ldots, ST_N$ from the N tridimensional sensors $3DS_1, \ldots, 3DS_N$ and stores said plurality of streams in a memory 23.

The memory 23 might be integrated in the central processing unit 22.

From the continuously received streams of point clouds, the central processing unit 22 dynamically generates and updates a global cumulated tridimensional map CM of the environment E surrounding the moving vehicle 10 or the convoy 1 of moving vehicles as it will now be described in greater details.

More specifically, for each newly received point cloud frame $PCF_j^i$ of each stream $ST_i$ of said plurality of streams, the central processing unit 22 generates or updates a global cumulated tridimensional map CM of the environment of said at least one vehicle by conducting the following operation.

By "newly received point cloud frame", it is meant the latest received point cloud frame at a given time step.

The method of the invention is advantageously performed dynamically while the motion of the vehicle and the streaming of the point cloud frame take place.

The global cumulated tridimensional map CM of the environment may comprises one sub-area $SA_1$ or several sub-areas $SA_1, \ldots, SA_M$, where M in the total number of sub-areas.

Each sub-area $SA_k$ (1≤k≤M) of the global cumulated tridimensional map CM has an associated global coordinate system $GCS_k$ in which the data points contained in said sub-area $SA_k$ are defined.

The global coordinate system $GCS_k$ associated to each sub-area $SA_k$ may in particular be independent of the vehicles and the movement of the vehicles themselves. The global coordinate system $GCS_k$ associated to each sub-area $SA_k$ can be only related to the locations of the objects in the environment of the moving vehicles.

In a particular embodiment of the invention, the global cumulated tridimensional map CM of the environment comprises a single sub-area $SA_1$ and a single associated global coordinate system $GCS_1$.

It should be noted that the global coordinate systems $GCS_k$ are in general not specifically calibrated with regards to the real physical environment of the convoy 1 or the vehicle 10. The global coordinate system $GCS_k$ associated to each sub-area $SA_k$ are for instance virtual coordinate systems obtained by aligning point cloud frames together, independently of any calibration apparatus or tool.

In the embodiment of the invention illustrated on FIG. 1, the plurality of tridimensional sensors $3DS_1, \ldots, 3DS_N$ comprises at least one first tridimensional sensor $3DS_i$ mounted on a first moving vehicle $V_i$ and at least one second tridimensional sensor $3DS_{i'}$ mounted on a second moving vehicle $V_{i'}$. The first tridimensional sensor $3DS_i$ and the second tridimensional sensor $3DS_{i'}$ communicates wirelessly with a common central processing unit 22 as detailed above. Then, the global cumulated tridimensional map advantageously comprises a common sub-area $SA_k$ representing, at the same time, the environment surrounding the first moving vehicle $V_i$ and the environment surrounding the second moving vehicle $V_{i'}$.

A common global coordinate system $GCS_k$ is associated to said common sub-area $SA_k$ representing the environment surrounding the first moving vehicles V1 and the environment surrounding the second moving vehicle V2. The point cloud frames generated by the first tridimensional sensor $3DS_i$ and the point cloud frames generated by the second tridimensional sensor $3DS_{i'}$ are converted in said common global coordinate system $GCS_k$ when said point cloud frames are aligned with the common sub-area $SA_k$.

Using this common sub-area $SA_k$ and common global coordinate system $GCS_k$ of the global cumulated tridimensional map CM, the driving or the driving assistance system of the second moving vehicle $V_{i'}$ can for instance easily take into account the environment surrounding the first moving vehicle $V_i$. If the first moving vehicle $V_i$, driving in front of the second moving vehicle $V_{i'}$, encounter an obstacle, the second moving vehicle $V_{i'}$ can take into account the environment of the first moving vehicle $V_1$ to adjust its behaviour. This specific situation is given as a matter of example only and it can easily be seen that other smart behaviours of the vehicles of the convoy can also be obtained from the invention.

Figure 3:
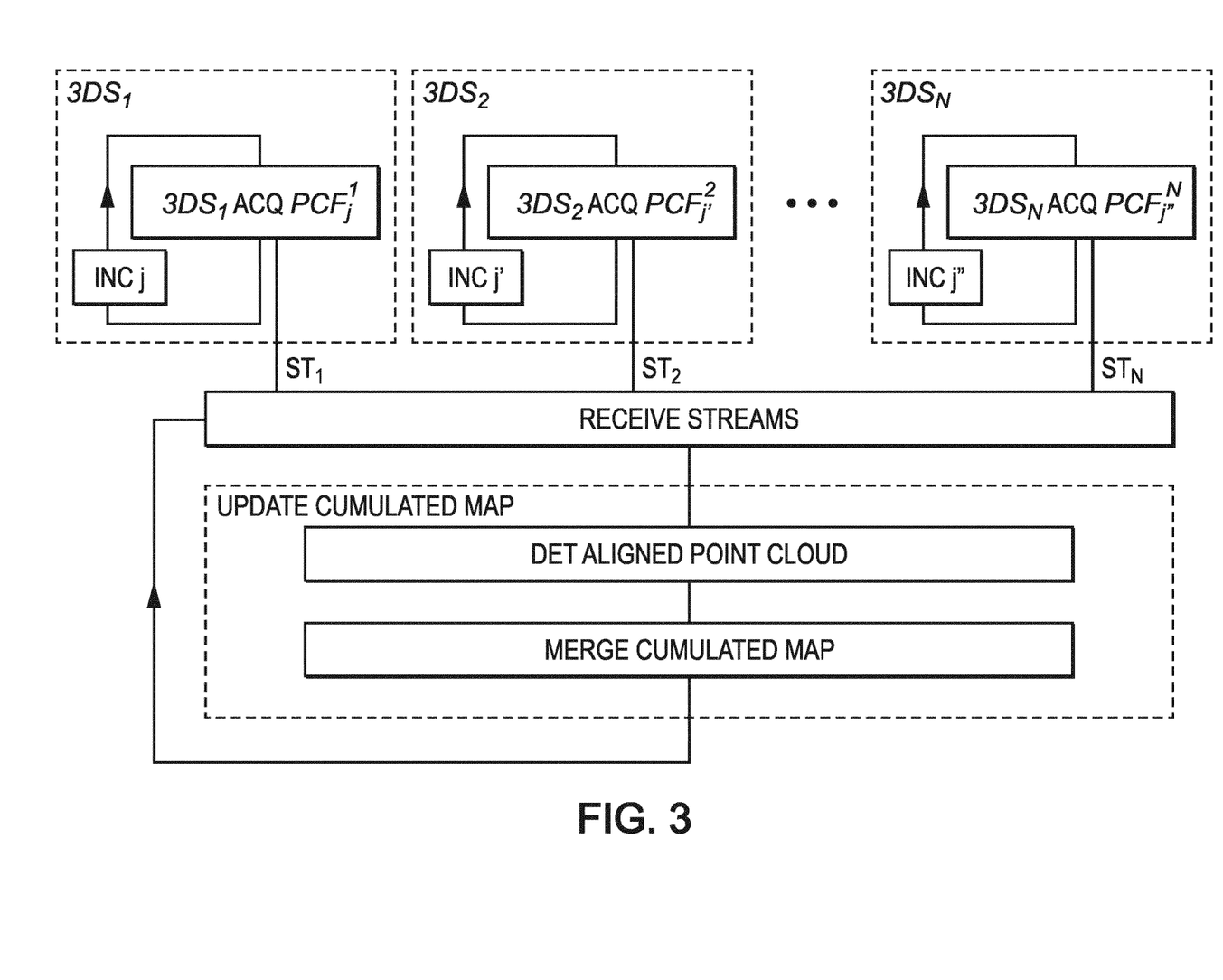
FIG. 3 is a flowchart detailing a method for dynamically generating and updating a global tridimensional map of an environment according to embodiments of the invention.
Figure 4:
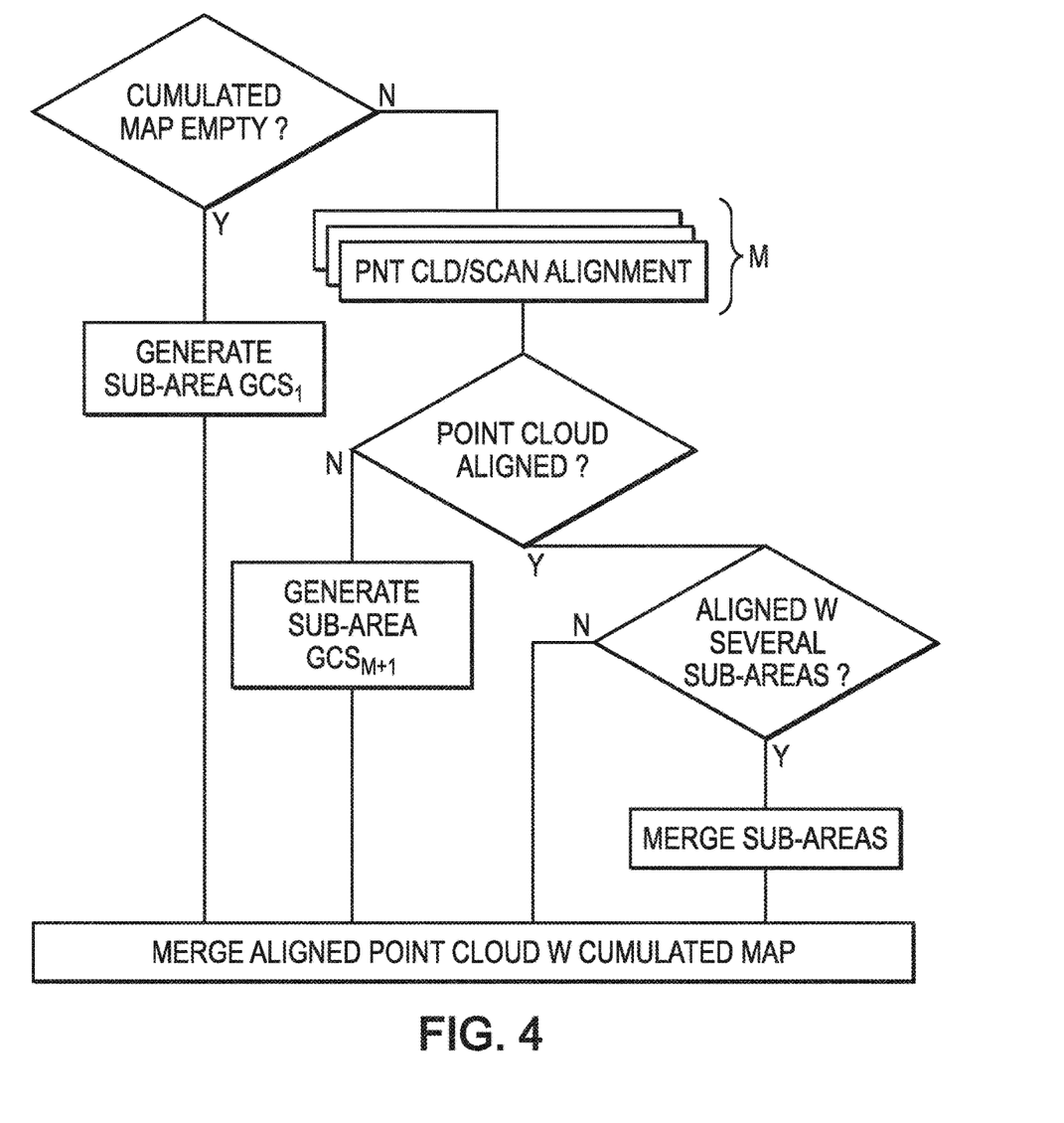
FIG. 4 is a flowchart detailing a step of generating or updating a global cumulated tridimensional map of the method of FIG. 3, according to embodiments of the invention.

Coming back to the method illustrated on FIGS. 3 and 4, during an operation b1), the central processing unit 22 determines an aligned point cloud frame $\overrightarrow{PCF}_j^i$ in a global coordinate system GCS of the environment of said at least one vehicle by comparing said point cloud frame $PCF_j^i$ with the global cumulated tridimensional map CM of the environment.

If the global cumulated tridimensional map CM of the environment doesn't exist yet or contain no data, the central processing unit 22 may create the global cumulated tridimensional map CM from the point cloud frame $PCF_j^i$. For instance, the point cloud frame may be the first received point cloud frame $PCF_0^0$ from a first sensor to send its point cloud frame to the central processing unit 22. A global coordinate system $GCS_0$ of the environment may then for instance be defined from the local coordinate system $CS_0$ associated to said sensor $ST_0$. The aligned point cloud frame $\overrightarrow{PCF}_j^i$ can be defined directly from the point cloud frame $PCF_j^i$.

If the global cumulated tridimensional map CM of the environment already exists and contains some data, operation b1) comprise the alignment of the point cloud frame to an aligned point cloud frame $\overrightarrow{PCF}_j^i$ in a global coordinate system GCS of the environment of said at least one vehicle.

This alignment is performed by comparing the newly received point cloud frame $PCF_j^i$ with the global cumulated tridimensional map CM of the environment.

The aligned point cloud frame $\overrightarrow{PCF}_j^i$ may be computed only from the point clouds acquired by the sensors 21 and without additional positioning information.

By "without additional positioning information", it is in particular meant that the computation of the aligned point cloud frame $\overrightarrow{PCF}_j^i$ does not require other input data than the point clouds acquired by the sensors 21 and the global cumulated tridimensional map CM. For instance, no additional localisation of orientation device, such as a GPS or an accelerometer, is required. Moreover, no assumption has to be made on the location or movement of the sensor.

The alignment may be performed for instance by using an Iterative Closest Point algorithm (ICP) as detailed by P. J. Besl and N. D. McKay in "A method for registration of 3-d shapes" published in IEEE Transactions on Pattern Analysis and Machine Intelligence, 14(2):239-256, 1992 or in "*Object modelling by registration of multiple range images*" by Yang Chen and Gerard Medioni published in Image Vision Comput., 10(3), 1992. An ICP algorithm involves search in transformation space trying to find the set of pair-wise transformations of scans by optimizing a function defined on transformation space. The variant of ICP involve optimization functions that range from being error metrics like "sum of least square distances" to quality metrics like "image distance" or probabilistic metrics. In this embodiment, the central processing unit 3 may thus optimize a function defined on a transformation space of each point clouds C to determine the updated tridimensional position and orientation of a sensor 2.

This way, it is possible to easily and efficiently compute an aligned point cloud frame $\overrightarrow{PCF}_j^i$.

The alignment procedure can be done in different ways, depending on the coverage of the global cumulated tridimensional map CM when the point cloud frame $PCF_j^i$ under consideration is received.

Let's assume that the global cumulated tridimensional map CM already comprises at least one global coordinate system $GCS_1$ and at least one associated sub-area $SA_1$ populated with data points in said global coordinate system. If not, the global cumulated tridimensional map CM is simply generated from the received point cloud as detailed above.

Said step b1) of determining an aligned point cloud frame $\overrightarrow{PCF}_j^i$ then comprises a first sub-step b1-1) of trying to align said point cloud frame $PCF_j^i$ so that at least a portion of the aligned point cloud frame $\overrightarrow{PCF}_j^i$ matches at least a portion of at least one sub-area of the global cumulated tridimensional map CM.

This sub-step can be accomplished by comparing said point cloud frame $PCF_j^i$ with each sub-area $SA_k$ of the global cumulated tridimensional map CM of the environment V as detailed above.

Then, during a step b2), the global cumulated tridimensional map CM is updated by merging said aligned point cloud frame $\overrightarrow{PCF}_j^i$ with the global cumulated tridimensional map CM.

More precisely, if the point cloud frame $PCF_j^i$ can be aligned with at least one sub-area $SA_k$ of the global cumulated tridimensional map CM of the environment V, step b2) then comprises a sub-step b2-1) of merging the aligned point cloud frame $\overrightarrow{PCF}_j^i$ with said at least one sub-area $SA_k$ of the global cumulated tridimensional map CM.

On the other hand, if the point cloud frame $PCF_j^i$ cannot be aligned with at least one sub-area of the global cumulated tridimensional map CM, step b2) can then advantageously comprises a sub-step b2-2) in which an additional global coordinate system $GCS_{M+1}$ and an associated additional sub-area $SA_{M-1}$ are generated in the global cumulated tridimensional map CM. Here the number m is the number of sub-areas $SA_k$ (1≤k≤M) in the global cumulated tridimensional map CM before the creation of the additional sub-area $SA_{M+1}$.

The additional sub-area $SA_{M+1}$ of the global cumulated tridimensional map CM is separated from the sub-areas $SA_k$ (1≤k≤M) previously contained in the global cumulated tridimensional map. The additional sub-area $SA_{M+1}$ comprises the newly received point cloud frame $PCF_j^i$.

By "the additional sub-area $SA_{M+1}$ is separated from the other sub-areas $SA_k$ (1≤k≤M)", it is meant that the data points in the additional sub-area are not connected or overlapping the data points of the other sub-areas $SA_k$ (1≤k≤M). This can for instance be accomplished by associating distinct sub-areas $SA_k$ with distant global coordinate systems $GCS_k$ or by indexing the data points of sub-areas $SA_k$ with the index k of the sub-area they belong to, in order to be able to differentiate data points belonging to distinct sub-areas $SA_k$.

When the global cumulated tridimensional map CM comprises several sub-areas $SA_1, \ldots, SA_M$, the updating of the global cumulated tridimensional map CM may be performed in a slightly different way that will now be detailed.

Indeed, the newly received point cloud frame $PCF_j^i$ may be used, not only to enrich and augment the coverage of a sub-area of the global cumulated tridimensional map CM but also to try to find connection between previously separated sub-areas.

For instance, the movement of a vehicle may bring the sensor mounted on this vehicle within an area that has been previously mapped by a sensor mounted on another vehicle. It is then especially interesting to merge the two originally separated sub-areas respectively recorded by said two sensors in a single map, using the newly acquired data points overlapping said two sub-areas.

The same can also happen for two sensors mounted on the same vehicle, for instance a sensor located on the front of the vehicle and another sensor located on the rear of the vehicle such as, when the vehicle is still, the field of view of the two sensor do not overlap. As soon as the vehicle start to move, for instance to go forward, an area of the environment located in front of the vehicle and that was previously only accessible to the front sensor, will pass to the rear of the vehicle and thus become accessible to the rear sensor. The two originally distinct sub-areas of the environment can then become connected and merged in a single sub-area surrounding the vehicle in which the point clouds acquired both by the front sensor and the rear sensor are aligned and merged in a single sub-area and a single global coordinate system.

To this aim, the step of trying to align the newly received point cloud frame $PCF_j^i$ may involve a simultaneous multi-scans alignment of the newly received point cloud frame $PCF_j^i$ together with each sub-area $SA_k$ of the global cumulated tridimensional map CM.

If the point cloud frame $PCF_j^i$ can be aligned more than one sub-area, said sub-areas should be able to be merged together. For instance, the point cloud frame $PCF_j^i$ may be aligned with two sub-areas $SA_m$, $SA_{m'}$ of the global cumulated tridimensional map CM. Then, said plurality of sub areas $SA_m$, $SA_{m'}$ and said point cloud frame $\overrightarrow{PCF}_j^i$ are aligned and merged in a single sub-area $SA_{m''}$ of the global cumulated tridimensional map CM associated to a single global coordinate system $GCS_{m''}$.

By "simultaneous multi-scans alignment", it is meant that the newly received point cloud frame $PCF_j^i$ together with the sub-areas $SA_k$ of the global cumulated tridimensional map CM are considered as scans that needs to be aligned together simultaneously.

The simultaneous multi-scans alignment may be performed for instance by using the Iterative Closest Point algorithm (ICP) as detailed above.

Then, the central processing unit 3 generates an aligned local point cloud A associated to each acquired point cloud C in which the data points D of said point cloud C are translated from the local coordinate system S to the global coordinate system G of the global tridimensional map CM. The aligned local point cloud A is determined on the basis of the updated tridimensional position and orientation of the sensor 2.

It should be noted that, the point clouds acquired by the tridimensional sensors 21 may comprise data points DP_E representative of points P_E of the environment E of a vehicle 10 but also data points DP_V representative of points P_V of the vehicle 10. For instance, if a sensor 21 is mounted on a roof of a vehicle 10, a point cloud acquired by the sensor 21 may capture some points of the roof of the vehicle.

If the present case we are more specifically interested in the data points DP_E representative of the environment E of the vehicle 1.

Each point cloud frame may thus be segmented to respectively identify and flag data points DP_E representative of the environment E and data points DP_V representative of the vehicle 10. This segmentation may be performed by comparing successive point cloud frames $PCF_{j-1}^i$, $PCF_j^i$ together in order to identify stationary points or region of the point clouds. Once the point cloud frames $PCF_j^i$ has been segmented, data points DP_V representative of the vehicle 10 may be disregarded from the point cloud frames $PCF_j^i$. This processing may be performed prior to trying to align the point cloud frame with the global cumulated map CM in order to reduce the noise and increase the accuracy of the generated global map.

In some embodiments of the invention, the step of determining an aligned point cloud frame $\overrightarrow{PCF}_j^i$ in a global coordinate system of the environment may also comprise computing a tridimensional position and orientation of sensor i at time $t_j^i$ in said global coordinate system GCS.

The tridimensional position and orientation of sensor i at time $t_j^i$ may be obtained, in a straightforward fashion, by determining the equivalent position of the origin of the local coordinate system $CS_i$ of sensor i in the global coordinate system GCS. This determination may involve tracking the location of a specific data point of the point cloud associated to the origin of the local coordinate system $CS_i$ or may be performed by computing a transformation function between the local coordinate system $CS_i$ of sensor i global coordinate system GCS corresponding to time $t_j^i$.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

The invention claimed is:

1. A method for dynamically generating and updating a global tridimensional map of an environment surrounding at least one moving vehicle, in which a plurality of N tridimensional sensors ($3DS_1, \ldots, 3DS_N$) is mounted on said at least one moving vehicle and communicates with at least one central processing unit, wherein:
   a) each sensor ($3DS_i$) of the plurality of N tridimensional sensors ($3DS_1, \ldots, 3DS_N$) generates a continuous stream ($ST_i$) of point cloud frames ($PCF_0^i$, $PCF_1^i, \ldots$), in parallel and asynchronously with the other sensors of the plurality of tridimensional sensors, wherein each point cloud frame ($PCF_j^i$) of said stream ($ST_i$) comprises a set of tridimensional data points acquired by said sensor ($3DS_i$) at a time ($t_j^i$), in a local coordinate system ($CS_i$) of said sensor, said tridimensional data points being representative of object surfaces located in a local volume ($L_j^i$) of the environment surrounding said sensor ($3DS_i$) at said time ($t_j^i$),
   b) said central processing unit continuously receives the plurality of N continuous streams ($ST_1, \ldots, ST_N$) from the N tridimensional sensors ($3DS_1, \ldots, 3DS_N$), stores said plurality of streams in a memory and, for each newly received point cloud frame ($PCF_j^i$) of each stream ($ST_i$) of said plurality of streams, generates or updates a global cumulated tridimensional map of the environment of said at least one vehicle by
      b1) determining an aligned point cloud frame ($\widetilde{PCF}_j^i$) in a global coordinate system (GCS) of the environment of said at least one vehicle by comparing said point cloud frame ($PCF_j^i$) with the global cumulated tridimensional map of the environment, and
      b2) updating said global cumulated tridimensional map by merging said aligned point cloud frame ($\widetilde{PCF}_j^i$) with said global cumulated tridimensional map.

2. The method according to claim 1, wherein the global cumulated tridimensional map comprises at least one global coordinate system ($GCS_1$) and at least one associated sub-area ($SA_1$) comprising a plurality of data points in said global coordinate system,
   wherein said step b1) of determining an aligned point cloud frame ($\widetilde{PCF}_j^i$) comprises:
      b1-1) trying to align said point cloud frame ($PCF_j^i$) so that at least a portion of the aligned point cloud frame ($\widetilde{PCF}_j^i$) matches at least a portion of said at least one sub-area of the global cumulated tridimensional map, by comparing said point cloud frame ($PCF_j^i$) with each sub-area of the global cumulated tridimensional map of the environment (E),
   and wherein said step b2) of updating said global cumulated tridimensional map of environment (E) comprises:
      b2-1) if said point cloud frame ($PCF_j^i$) can be aligned with at least one sub-area of the global cumulated tridimensional map of the environment (E), merging the aligned point cloud frame ($\widetilde{PCF}_j^i$) with said at least one sub-area ($SA_k$) of the global cumulated tridimensional map,
      b2-2) if said point cloud frame ($PCF_j^i$) cannot be aligned with at least one sub-area of the global cumulated tridimensional map of the environment, generating an additional global coordinate system ($GCS_2$) and an associated additional sub-area ($SA_2$) of the global cumulated tridimensional map, said additional sub-area of the global cumulated tridimensional map being separated from the sub-areas previously contained in the global cumulated tridimensional map and comprising said point cloud frame ($PCF_j^i$).

3. The method according to claim 2, wherein if the global cumulated tridimensional map comprises several sub-areas ($SA_1, \ldots, SA_M$), step b1-1) of trying to align a point cloud frame ($PCF_j^i$) further comprises trying to align together, in a multi-scan alignment step, said sub-areas ($SA_1, \ldots, SA_M$) and said point cloud frame ($PCF_j^i$), so that at least a portion of an aligned point cloud frame ($\widetilde{PCF}_j^i$) matches with at least one sub-area ($SA_1, \ldots, SA_M$) of the global cumulated tridimensional map,
   and wherein if the point cloud frame ($PCF_j^i$) can be aligned with a plurality of sub-areas ($SA_m, SA_{m'}$) of the global cumulated tridimensional map, said plurality of sub-areas ($SA_m, SA_{m'}$) and said point cloud frame ($\widetilde{PCF}_j^i$) are aligned and merged in a single sub-area ($SA_{m''}$) of the global cumulated tridimensional map associated to a single global coordinate system ($GCS_{m''}$).

4. The method according to claim 3, wherein the N tridimensional sensors ($3DS_1, \ldots, 3DS_N$) comprises at least one first tridimensional sensor ($3DS_i$) mounted on a first moving vehicle and at least one second tridimensional sensor ($3DS_{i'}$) mounted on a second moving vehicle,
   and wherein said at least one first tridimensional sensor ($3DS_i$) and said at least one second tridimensional sensor ($3DS_{i'}$) communicates wirelessly with a common central processing unit (22) and wherein the global cumulated tridimensional map comprises a common sub-area ($SA_k$) representing the environment (E) surrounding the first moving vehicle and the environment surrounding the second moving vehicle.

5. The method according to claim 3, wherein the global cumulated tridimensional map comprises a common global coordinate system ($GCS_k$) associated to said common sub-area ($SA_k$) representing the environment (E) surrounding the first moving vehicles and the environment surrounding the second moving vehicle, in which a point cloud frames ($PCF_j^i$) generated by the at least one first tridimensional sensor ($3DS_i$) and point cloud frames ($PCF_j^{i'}$) generated by the at least one second tridimensional sensor ($3DS_{i'}$) are converted.

6. The method according to claim 2, wherein the N tridimensional sensors ($3DS_1, \ldots, 3DS_N$) comprises at least one first tridimensional sensor ($3DS_i$) mounted on a first moving vehicle and at least one second tridimensional sensor ($3DS_{i'}$) mounted on a second moving vehicle, and wherein said at least one first tridimensional sensor ($3DS_i$) and said at least one second tridimensional sensor ($3DS_{i'}$) communicates wirelessly with a common central processing unit (22) and wherein the global cumulated tridimensional map comprises a common sub-area ($SA_k$) representing the environment (E) surrounding the first moving vehicle and the environment surrounding the second moving vehicle.

7. The method according to claim 2, wherein the global cumulated tridimensional map comprises a common global coordinate system ($GCS_k$) associated to said common sub-area ($SA_k$) representing the environment (E) surrounding the first moving vehicles and the environment surrounding the second moving vehicle, in which a point cloud frames ($PCF_j^i$) generated by the at least one first tridimensional sensor ($3DS_i$) and point cloud frames ($PCF_j^{i'}$) generated by the at least one second tridimensional sensor ($3DS_{i'}$) are converted.

8. The method according to claim 1, wherein the N tridimensional sensors ($3DS_1, \ldots, 3DS_N$) comprises at least one first tridimensional sensor ($3DS_1$) mounted on a first moving vehicle and at least one second tridimensional sensor ($3DS_{i'}$) mounted on a second moving vehicle, and wherein said at least one first tridimensional sensor ($3DS_i$) and said at least one second tridimensional sensor ($3DS_{i'}$) communicates wirelessly with a common central processing unit (22) and wherein the global cumulated tridimensional map comprises a common sub-area ($SA_k$) representing the environment (E) surrounding the first moving vehicle and the environment surrounding the second moving vehicle.

9. The method according to claim 8, wherein the global cumulated tridimensional map comprises a common global coordinate system ($GCS_k$) associated to said common sub-area ($SA_k$) representing the environment (E) surrounding the first moving vehicles and the environment surrounding the second moving vehicle, in which a point cloud frames ($PCF_j^i$) generated by the at least one first tridimensional sensor ($3DS_i$) and point cloud frames ($PCF_j^{i'}$) generated by the at least one second tridimensional sensor ($3DS_{i'}$) are converted.

10. The method according to claim 1, wherein the global cumulated tridimensional map comprises a common global coordinate system ($GCS_k$) associated to said common sub-area ($SA_k$) representing the environment (E) surrounding the first moving vehicles and the environment surrounding the second moving vehicle, in which a point cloud frames ($PCF_j^i$) generated by the at least one first tridimensional sensor ($3DS_i$) and point cloud frames ($PCF_j^{i'}$) generated by the at least one second tridimensional sensor ($3DS_{i'}$) are converted.

11. The method according to claim 1, wherein said step b1) of determining an aligned point cloud frame ($\widetilde{PCF}_j^i$) for a newly received point cloud frame ($PCF_j^i$) of a stream ($ST_i$) of the plurality of N continuous streams comprises determining a tridimensional position and orientation, at at least one time ($t_j^i$), of a sensor ($3DS_i$) generating said stream ($ST_i$), in the global coordinate system of the environment.

12. The method according to claim 11, wherein the determination of the tridimensional position and orientation, at at least one time ($t_j^i$), of said sensor ($3DS_i$) is computed only from the newly received point cloud frame ($PCF_j^i$) of the stream ($ST_i$) and the global cumulated tridimensional map, and without additional positioning information of the at least one vehicle or of the plurality of tridimensional sensors ($3DS_1, \ldots, 3DS_N$).

13. The method according to claim 1, wherein a first sensor ($3DS_i$) and a second sensor ($3DS_{i'}$) of the plurality of N tridimensional sensors ($3DS_1, \ldots, 3DS_N$) are unsynchronized at least during a period of time T, in particular, point cloud frames ($PCF_j^i$, $PCF_{j'}^{i'}$) of the respective streams ($ST_i$, $ST_{i'}$) of the first sensor ($3DS_i$) and the second sensor ($3DS_{i'}$) acquired during said period of time T are acquired at differing times $t_j^i \neq t_{j'}^{i'}$, $\forall j,j'$ such as $t_j^i, t_{j'}^{i'} \subset T$.

14. The method according to claim 1, wherein a first sensor ($3DS_i$) and a second sensor ($3DS_{i'}$) of the N tridimensional sensors ($3DS_1, \ldots, 3DS_N$) have non-overlapping respective fields of view at least during a period of time T, in particular, point cloud frames ($PCF_j^i$, $PCF_{j'}^{i'}$) of the respective streams ($ST_i$, $ST_{i'}$) of the first sensor ($3DS_i$) and the second sensor ($3DS_{i'}$) acquired during said period of time T cover non-overlapping respective local volumes $L_j^i \cap L_{j'}^{i'} = \emptyset, \forall j,j'$ such as $t_j^i, t_{j'}^{i'} \in T$.

15. The method according to claim 1, wherein the step of determining an aligned point cloud frame ($\widetilde{PCF}_j^i$) in a global coordinate system (GCS) of the environment comprise a step of segmenting data points of the point cloud frame ($PCF_j^i$) to identify and flag data points representative of the environment (E) and data points representative of the vehicle (10) on which the sensor ($3DS_i$) that acquired said point cloud frame ($PCF_j^i$) is mounted, in particular wherein the aligned point cloud frame ($\widetilde{PCF}_j^i$) is restricted to data points representative of the environment (E).

16. A non-transitory computer readable storage medium, having stored thereon a computer program comprising program instructions, the computer program being loadable into a central processing unit (22) of a global tridimensional map generating and updating a global tridimensional map generating and updating system (2) for at least one vehicle (10), the system comprising a plurality of N tridimensional sensors ($3DS_1, \ldots, 3DS_N$) adapted to be mounted on said at least one vehicle 10, each sensor ($3DS_i$) of the plurality of N tridimensional sensors ($3DS_1, \ldots, 3DS_N$) being adapted to generate a continuous stream ($ST_i$) of point cloud frames ($PCF_0^i$, $PCF_1^i, \ldots$), in parallel and asynchronously with the other sensors of the plurality of tridimensional sensors, wherein each point cloud frame ($PCF_j^i$) of said stream ($ST_i$) comprises a set of tridimensional data points acquired by said sensor ($3DS_i$) at a time ($t_j^i$), in a local coordinate system ($CS_i$) of said sensor, said tridimensional data points being representative of object surfaces located in a local volume ($L_j^i$) of the environment surrounding said sensor ($3DS_i$) at said time ($t_j^i$), a central processing unit (22) adapted to communicate with each tridimensional sensor of said plurality of sensors to continuously receive the plurality of N continuous streams ($ST_1, \ldots, ST_N$) from the N tridimensional sensors ($3DS_1, \ldots, 3DS_N$), store said plurality of streams in a memory (23) and update a global cumulated tridimensional map of the environment surrounding said at least one vehicle (10) by determining, for each newly received point cloud frame ($PCF_j^i$) of each stream ($ST_i$) of said plurality of streams, an aligned point cloud frame ($\overline{PCF}_j^i$) in a global coordinate system of the environment (E) of said at least one vehicle (10) by comparing said point cloud frame ($PCF_j^i$) with the global cumulated tridimensional map of the environment and updating said global cumulated tridimensional map by merging said aligned point cloud frame ($\overline{PCF}_j^i$) with said global cumulated tridimensional map;

wherein the computer program causes the central processing unit to carry out the steps of a method according to claim 1, when the computer program is run by the central processing unit.

17. A global tridimensional map generating and updating system (2) for at least one vehicle (10), the system comprising
- a plurality of N tridimensional sensors ($3DS_1, \ldots, 3DS_N$) adapted to be mounted on said at least one vehicle 10,
- each sensor ($3DS_i$) of the plurality of N tridimensional sensors ($3DS_1, \ldots, 3DS_N$) being adapted to generate a continuous stream ($ST_i$) of point cloud frames ($PCF_0^i$, $PCF_1^i, \ldots$), in parallel and asynchronously with the other sensors of the plurality of tridimensional sensors, wherein each point cloud frame ($PCF_j^i$) of said stream ($ST_i$) comprises a set of tridimensional data points acquired by said sensor ($3DS_i$) at a time ($t_j^i$), in a local coordinate system ($CS_i$) of said sensor, said tridimensional data points being representative of object surfaces located in a local volume ($L_j^i$) of the environment surrounding said sensor ($3DS_i$) at said time ($t_j^i$),
- a central processing unit (22) adapted to communicate with each tridimensional sensor of said plurality of sensors to continuously receive the plurality of N continuous streams ($ST_1, \ldots, ST_N$) from the N tridimensional sensors ($3DS_1, \ldots, 3DS_N$), store said plurality of streams in a memory (23) and update a global cumulated tridimensional map of the environment surrounding said at least one vehicle (10) by determining, for each newly received point cloud frame ($PCF_j^i$) of each stream ($ST_i$) of said plurality of streams, an aligned point cloud frame ($\overline{PCF}_j^i$) in a global coordinate system of the environment (E) of said at least one vehicle (10) by comparing said point cloud frame ($PCF_j^i$) with the global cumulated tridimensional map of the environment and updating said global cumulated tridimensional map by merging said aligned point cloud frame ($\overline{PCF}_j^i$) with said global cumulated tridimensional map.

18. An autonomous or semi-autonomous vehicle (10) comprising a global tridimensional map generating and updating system (2) according to claim 17,
- wherein the plurality of N tridimensional sensors ($3DS_1, \ldots, 3DS_N$) of said system is mounted on said vehicle (10), and
- the vehicle (10) comprises a vehicle processing unit (18) adapted to receive and store the global cumulated tridimensional map generated and updated by said system (2) and to assist or control a driving of the vehicle (10) based at least on said global cumulated tridimensional map.

19. A convoy (1) of autonomous or semi-autonomous vehicles (10) comprising a plurality of autonomous or semi-autonomous vehicles (10) and a global tridimensional map generating and updating system (2) according to claim 17,
- wherein at least one tridimensional sensor of the plurality of N tridimensional sensors ($3DS_1, \ldots, 3DS_N$) is mounted on each vehicle (10) of the convoy,
- wherein each vehicle (10) of the convoy comprises a vehicle processing unit (18) adapted to receive and store the global cumulated tridimensional map generated and updated by said system (2) and to assist or control a driving of the vehicle (10) based at least on said global cumulated tridimensional map.

20. The convoy of claim 19, wherein the vehicle processing unit (18) of each vehicle of the convoy is a central processing unit (22) of the system (2) and is adapted to communicate with each tridimensional sensor of said plurality of sensors to continuously receive the plurality of N continuous streams ($ST_1, \ldots, ST_N$) from the N tridimensional sensors ($3DS_1, \ldots, 3DS_N$), store said plurality of streams in a memory (23) and update a global cumulated tridimensional map of the environment surrounding the convoy of vehicles.

* * * * *